(12) United States Patent
Lee

(10) Patent No.: US 8,156,264 B2
(45) Date of Patent: Apr. 10, 2012

(54) DIGITAL OUTPUT SENSOR FIFO BUFFER WITH SINGLE PORT MEMORY

(75) Inventor: James M. Lee, Northborough, MA (US)

(73) Assignee: Analog Devices, Inc., Norwood, MA (US)

( * ) Notice: Subject to any disclaimer, the term of this patent is extended or adjusted under 35 U.S.C. 154(b) by 284 days.

(21) Appl. No.: 12/418,098

(22) Filed: Apr. 3, 2009

(65) Prior Publication Data

US 2010/0257292 A1    Oct. 7, 2010

(51) Int. Cl.
*G06F 3/00* (2006.01)
*G06F 5/00* (2006.01)

(52) U.S. Cl. ........................................ 710/52
(58) Field of Classification Search ............. 710/52
See application file for complete search history.

(56) References Cited

U.S. PATENT DOCUMENTS

| | | | |
|---|---|---|---|
| 4,638,289 A | 1/1987 | Zottnik | 340/52 H |
| 5,974,482 A | 10/1999 | Gerhart | 710/52 |
| 6,334,181 B1 | 12/2001 | Boutaud et al. | 712/38 |
| 6,661,359 B2 | 12/2003 | Hernden et al. | 341/111 |
| 6,774,943 B1 * | 8/2004 | Kao et al. | 348/252 |
| 7,181,563 B2 | 2/2007 | Andreev et al. | 711/5 |
| 7,205,173 B2 | 4/2007 | Brunson et al. | 438/48 |
| 7,487,302 B2 | 2/2009 | Gouldey et al. | 711/154 |
| 2006/0142913 A1 | 6/2006 | Coffee et al. | 701/35 |
| 2007/0094481 A1 | 4/2007 | Snook et al. | 706/20 |
| 2008/0016961 A1 | 1/2008 | Dwyer et al. | 73/504.02 |
| 2009/0113176 A1 | 4/2009 | Hansen et al. | 345/522 |
| 2009/0119464 A1 | 5/2009 | Grundy et al. | 711/154 |

FOREIGN PATENT DOCUMENTS

| | | |
|---|---|---|
| EP | 0299228 | 1/1989 |
| WO | WO 2010/114758 | 10/2010 |

OTHER PUBLICATIONS

International Searching Authority, Invitation to Pay Additional Fees and, Where Applicable, Protest Fee, International Application No. PCT/US2010/028641, dated Dec. 13, 2010, 4 pages.
Bliley, K., et al., "Design of a Compact System Using a MEMS Accelerometer to Measure Body Posture and Ambulation," *IEEE*, 2006, 4 pages.
Knivett, Vanessa, "MEMS Accelerometers: A Fast-Track to Design Success?" http://www.analog-europe.com/213403671..../ Feb. 11, 2009, 3 pages.
Pasolini, F., "AN1515 Application Note—LIS1R02 (L6671): A Digital Output Angular Accelerometer," Feb. 2002, pp. 1-12.

(Continued)

*Primary Examiner* — Chun-Kuan Lee
(74) *Attorney, Agent, or Firm* — Sunstein Kann Murphy & Timbers LLP

(57) ABSTRACT

A digital output sensor includes a sensor module for providing digital data representative of a sensed parameter, a First-In-First-Out (FIFO) memory having a single port memory, and an output port for transmitting the digital data. The digital data from the sensor module is pushed into the FIFO memory buffer via the single memory port, and the digital data is popped out of the FIFO memory buffer via the single memory port for receipt by the output port.

14 Claims, 3 Drawing Sheets

OTHER PUBLICATIONS

VTI Technologies, Product Family Specification—SCA3000 Series—3-Axis Accelerometer, pp. 1-43.
VTI Technologies, Data Sheet—SCA3000-D02 3—Axis Low Power Accelerometer with Digital $I^2C$ Interface, pp. 1-4.
International Searching Authority, International Search Report—International Application No. PCT/US2010/028641, dated Feb. 14, 2010, together with the Written Opinion of the International Searching Authority, 10 pages.

* cited by examiner

DIGITAL OUTPUT SENSOR FIFO BUFFER WITH SINGLE PORT MEMORY

CROSS-REFERENCE TO RELATED APPLICATIONS

This patent application is related to: U.S. patent application Ser. No. 12/408,540 filed Mar. 20, 2009, entitled ACTIVITY DETECTION IN MEMS ACCELEROMETERS; U.S. patent application Ser. No. 12/408,536 filed Mar. 20, 2009 entitled MANAGEMENT SYSTEM FOR MEMS INERTIAL SENSORS; and U.S. patent application Ser. No. 12/408,532, filed Mar. 20, 2009, entitled SYSTEM AND METHOD FOR CAPTURING AN EVENT IN MEMS INERTIAL SENSORS, each disclosure of which is incorporated by reference herein in its entirety.

TECHNICAL FIELD

The present invention generally relates to a digital output sensor, and more particularly, a MEMS inertial sensor having a FIFO buffer device with a single port memory.

BACKGROUND ART

First-In-First-Out (FIFO) buffers are often used in serial interfaces such as Universal Asynchronous Receiver/Transmitters (UARTs) to buffer data. The FIFO buffer allows for longer latency when a processor needs to acquire data asynchronously without dropping data. Most digital output sensors have a simple serial port, such as Inter-IC (I2C) or Serial Peripheral Interface (SPI), which are read only occasionally without the need for a FIFO buffer to store samples.

A FIFO buffer is often implemented using an array of registers or flip-flops. Typically, FIFO buffers include a dual port memory in which one port is used to add new data and another port is used to read the older data. Each port adds additional gates and/or transistors, consequently consuming a relatively large area on a given chip. Area constraints placed on contemporary digital output sensors, such as small MEMS accelerometer digital output sensors, discourage the use of dual port memory. Sensor FIFO design is further complicated by the potential asynchronous timing between when reads and writes occur.

SUMMARY OF THE INVENTION

In accordance with one embodiment of the invention, a digital output sensor includes a sensor module for providing digital data representative of a sensed parameter, a First-In-First-Out (FIFO) memory buffer having a single port memory, and an output port for transmitting the digital data. The digital data from the sensor module is pushed into the FIFO memory buffer via a single memory port, and the digital data is popped out of the FIFO memory buffer via the single memory port for receipt by the output port.

In accordance with another embodiment of the invention, a method of providing sensor data within a digital output sensor includes providing digital data representative of a sensed parameter. The digital data is sent to a First-In-First-Out (FIFO) memory buffer having a single memory port, wherein the digital data is received and pushed into the FIFO memory buffer via a single memory port. The digital data is popped out of the FIFO memory buffer via the single memory port for sending to an output port.

In accordance with yet another embodiment of the invention, a computer program product for use on a computer system for controlling a digital output sensor is presented. The digital output sensor has a sensor module for providing digital data representative of a sensed parameter, an output port for transmitting the digital data, and a First-In-First-Out (FIFO) memory buffer having a single port memory. The computer program product includes a computer usable medium having computer readable program code thereon. The computer readable program code includes program code for controlling the pushing of the digital data from the sensor module into the FIFO memory buffer via a single memory port. The computer readable program code further includes program code for controlling the popping of the digital data out of the FIFO memory buffer via the single memory port for receipt by the output port.

In some related embodiments, the digital output sensor may include an output holding register operatively coupled between the sensor module and the single port memory. The output holding register temporarily stores the digital data prior to being pushed into the FIFO memory buffer via the single memory port. The digital output sensor may include an output staging register operatively coupled between the single port memory and the output port. The output staging register temporarily stores popped digital data from the FIFO memory buffer via the single port memory prior to receipt by the output port. A controller may control the FIFO memory buffer to pop the digital data to the output staging register substantially upon the output port becoming not busy. The digital output sensor may have two modes, wherein when the digital output sensor is in a first mode the output holding register temporarily stores the digital data prior to being pushed into the FIFO memory buffer via the single memory port, and the output staging register temporarily stores the digital data popped from the FIFO memory buffer via the single memory port prior to receipt by the output port. When the digital output sensor is in a second mode the FIFO buffer is bypassed such that digital data is transferred from the output holding register to the output staging register without passing through the FIFO memory buffer.

In further related embodiments, the output port may have a data transfer rate that is faster than the sensor module digital data output rate. The digital output sensor may include a MEMS accelerometer. The FIFO memory buffer may be narrower than the width of a data entry to be transferred, such that a plurality of writes to the FIFO memory buffer is performed when pushing a data entry to the FIFO memory buffer, and a plurality of reads from FIFO memory buffer is performed when popping a data entry to the output port. The output port may be a serial port. The digital output sensor may be provided on a single chip.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

In illustrative embodiments, a system and method for a digital output sensor that includes a small, low power FIFO buffer is presented. Generally, the system and method includes a FIFO memory buffer having only a single port memory for inputting and outputting data. Details of illustrative embodiments are discussed below.

Figure 1:
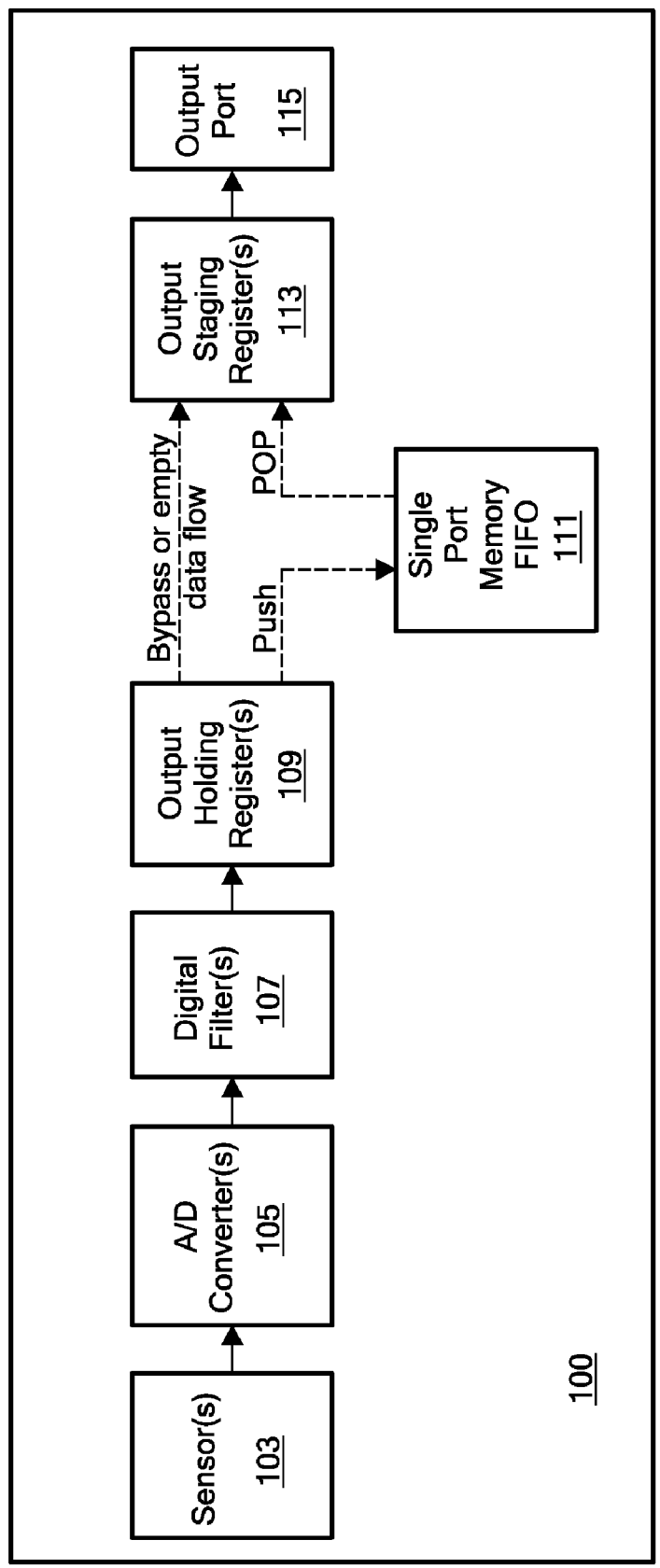
FIG. 1 shows a schematic block diagram of a digital output sensor, in accordance with various embodiments of the invention.

FIG. 1 shows a schematic block diagram of a digital output sensor 100, in accordance with various embodiments of the invention. The digital output sensor 100 includes at least one sensor 103 that provides a signal representative of a sensed parameter. The sensed parameter may pertain to any one of a wide variety of measurable quantities as known in the art, and may be used in various applications such as cars, machines, aerospace, medicine, manufacturing, gaming devices, cell phones, personal digital assistants and robotics.

The sensor 100 may be, without limitation, a microelectronic system (MEMS) device that is relatively small in size and has the capability to detect relatively small changes in the measured parameter. MEMS inertial sensor devices, such as accelerometers or gyroscopes, typically employ a movable, inertial mass formed with one or more fixed, non-moving structures. For example, in a MEMS accelerometer, the inertial mass may be suspended in a plane above a substrate and movable with respect to the substrate. The movable structure and the fixed structures form a capacitor having a capacitance that changes when the movable structure moves relative to the fixed structures in response to applied forces, such as along a predetermined axis of the device, e.g., x-, y- and z-axes.

Currently, among other things, inertial sensors may be used, without limitation, for monitoring the interaction of users with electronic devices, such as gaming devices, cell phones, personal digital assistants, and medical devices. One or more inertial sensors in the devices may sense a movement above a particular threshold or a change in orientation. The inertial sensor may be combined with digital electronics to form the digital output sensor, which is typically implemented on a single chip that interfaces with an external computer or microprocessor responding to the detected movement.

Referring back to FIG. 1, the signal representative of the sensed parameter and provided by sensor 103 is typically in analog form, and is converted into digital data by an A/D converter 105 operatively coupled to the sensor 103. The digital data from the A/D converter 105 may optionally be filtered using one or more digital filters 107.

In illustrative embodiments of the invention, the digital data is pushed into a FIFO memory buffer 111 having only a single port memory. The single port memory may include, without limitation, random access memory (RAM). In contrast to a dual port memory, a single port memory advantageously uses substantially less transistors and therefore consumes much less area on a chip. This is critical in those applications in which space is at a premium. As the single port memory cannot be both written to and read from simultaneously in the same clock cycle, the asynchronous timing of the reads and writes and the potential need for concurrent reads and writes is non-trivial. The timing control associated with the single port memory is discussed in greater detail below with regard to its implementation.

Digital data stored in the FIFO memory buffer 111 is provided to an output port 115 via the single memory port. The output port 115 may be, without limitation, a serial port such as Inter-IC (I2C) or Serial Peripheral Interface (SPI). Other types of ports may also be utilized, as known in the art.

The output port 115 may interface with, for example, a microprocessor that is external to digital output sensor 100. The data requested by, and output to the external processor via output port 115 is typically asynchronous with the digital data output from the sensor 103.

An output holding register 109 and/or output staging register 113 may be used to input and output data to and from the FIFO memory buffer 111, respectively, to better accommodate asynchronous read and writes as needed, in accordance with various embodiments of the invention. For example, an external processor may asynchronously read data from output port 115 without having the luxury of time to read data from the FIFO memory buffer 111. In such instances, the data may be popped from the FIFO memory buffer 111 via the single memory port and held in the output staging register 113 before it is needed by output port 115. In a similar manner, digital data from, for example, the A/D converter 105 or digital filter 107 may be stored temporarily in the output holding register 109, providing sufficient time for the single port memory of the FIFO memory buffer 111 to become available.

Figure 2:
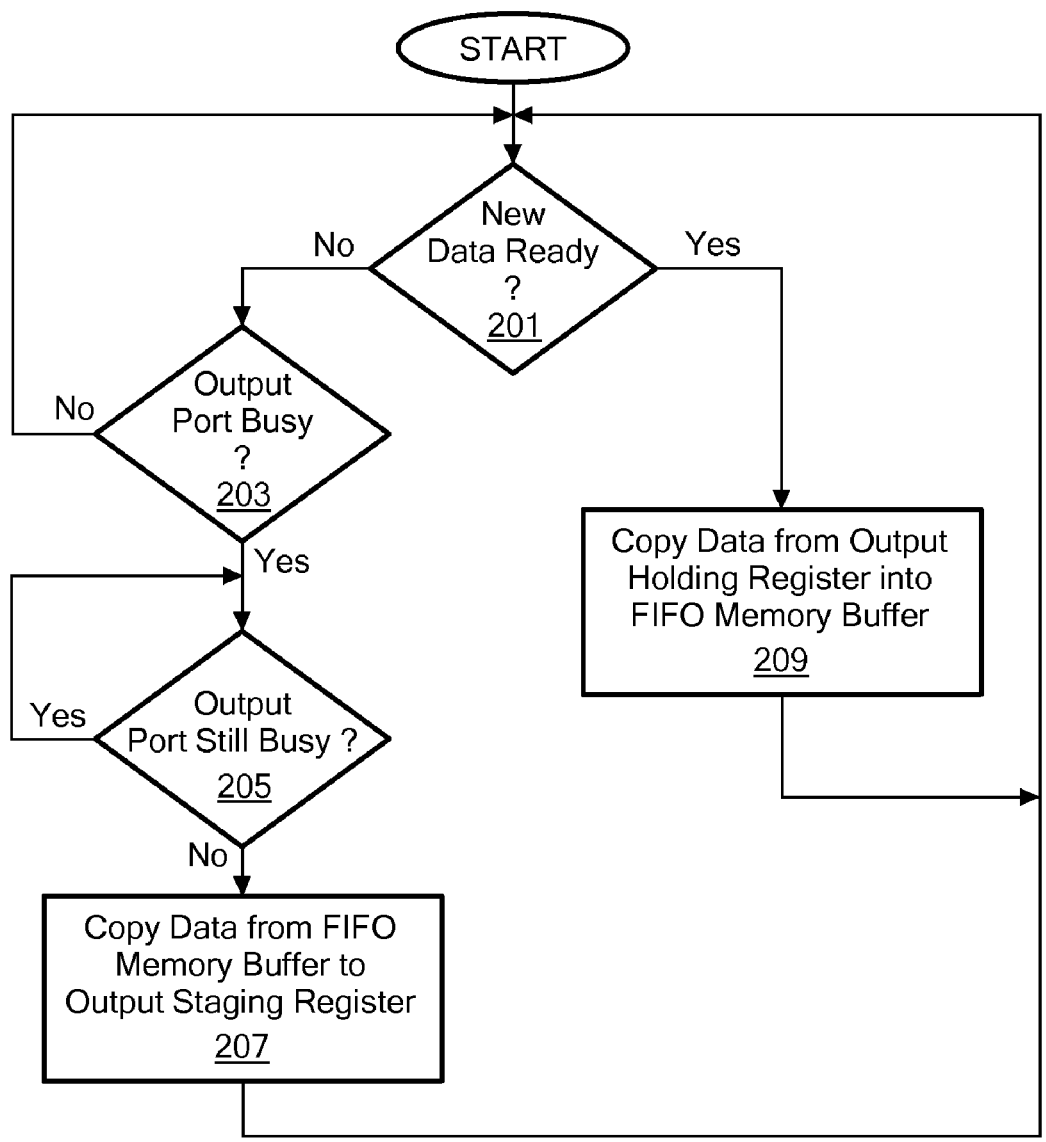
FIG. 2 shows a process of pushing and popping digital data onto a FIFO memory buffer via a single port memory, in accordance with various embodiments of the invention.

FIG. 2 shows a process of pushing and popping digital data onto the FIFO memory buffer 111 via the single memory port, in accordance with various embodiments of the invention. The process shown in FIG. 2 may be based on the assumption that the output port 115 rate for transferring data from the output staging register 113 is faster than the time it takes for new data to be ready at the output holding register 109. In other words, the busy time of the output port 115 to transfer data held in the output staging register 113 is less than the time it takes for new data to be ready at the output holding register 109. An emphasis is placed on having data available at the output staging register 113 prior to the output port 115 requesting the data.

The process begins at step 201, in which there is a determination of whether there is new data ready at the output holding register 109. This step (and various steps that follow) may be performed by control circuitry and/or firmware within the digital output sensor 100. More particularly, the digital output sensor 100 may include a controller that includes an application specific integrated circuit (ASIC), or firmware executed by a processor. In various embodiments, a single controller controls the pushing and popping of data to and from the FIFO memory buffer, such that the timing required for a single port memory is implemented without conflict from other controllers.

If there is no new data ready at the output holding register 109, the process continues to step 203, in which there is a determination as to whether the output port 115 is busy transferring data. If the output port 115 is not transferring data, the process returns to step 201. If the output port 115 is busy transferring data, the process continues to step 205, in which the process waits until the output port 115 is not busy. Upon the output port 115 being not busy, data is popped from the FIFO memory buffer 111 into the output staging register 113 via the single memory port, in step 207. In this manner, data is made available to the output staging register 113 substantially right after the output port 115 has finished a data transfer. This ensures that data is available at the output staging register 113 in a timely manner, generally prior to the next read of the output staging register 113 by the output port 115. Upon transferring the data from the FIFO memory buffer 111 to the output staging register 113, the process returns to step 201.

Referring back to step 201, if new data is ready at the output holding register 109, the process continues to step 209. In step 209, the digital data in the output holding register 109 is pushed from the output holding register 109 into the FIFO memory buffer 111 via the single memory port. Upon transferring the data from the FIFO memory buffer 111 to the output staging register 113, the process returns to step 201.

In various embodiments of the invention the digital output sensor 100 may include a first mode in which data is passed to and from the FIFO memory buffer 111 via the single memory port using, for example, output holding and staging registers 109 and 113, as described above. Additionally, the digital output sensor 100 may include a second mode, in which the FIFO memory buffer 111 is bypassed such that digital data is transferred from the output holding register 109 directly to the output staging register 113 without passing through the FIFO memory buffer 111.

Figure 3:
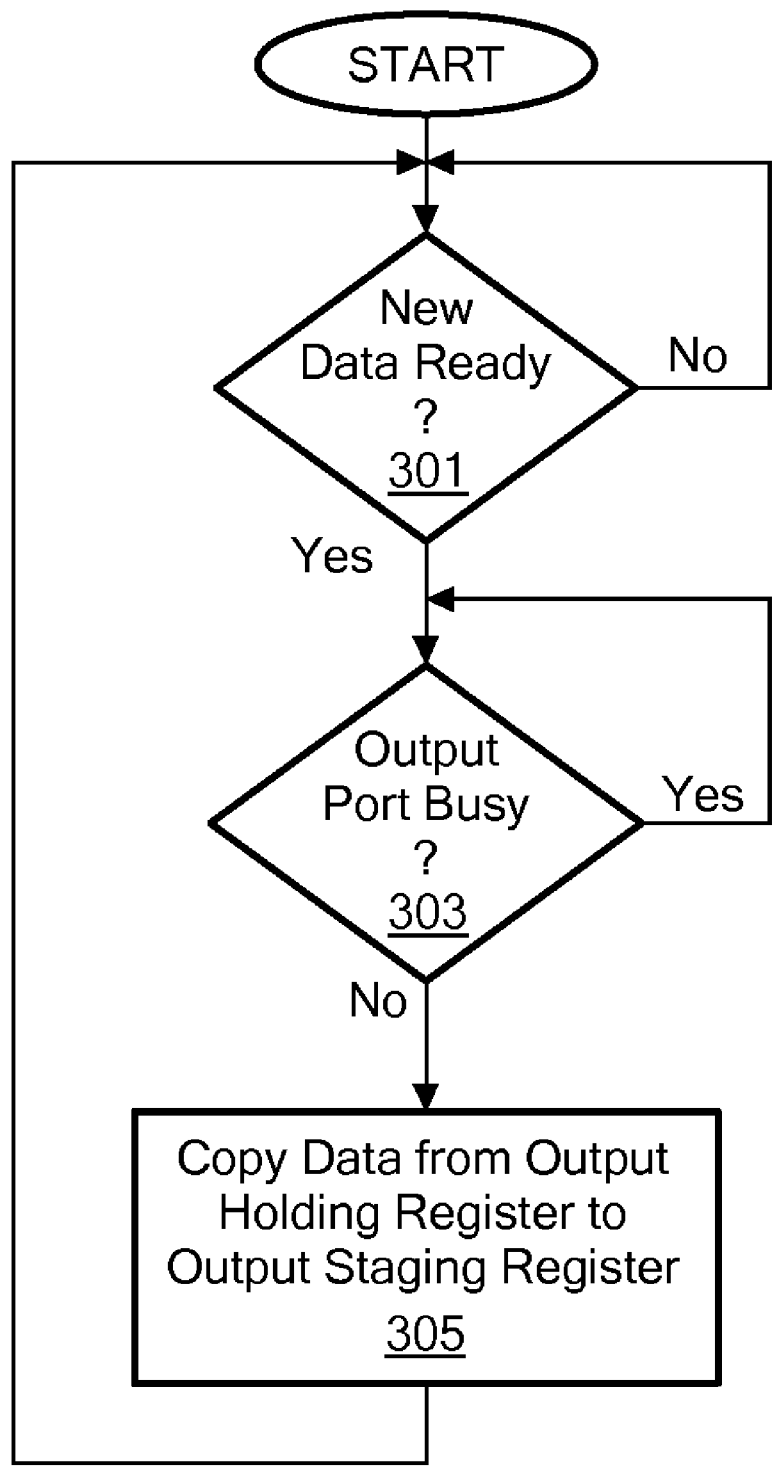
FIG. 3 shows a process of transferring digital data when in FIFO buffer bypass mode, or when the FIFO buffer is empty, in accordance with various embodiments of the invention.

FIG. 3 shows a process in which the FIFO memory buffer 111 may be bypassed, in accordance with various embodiments of the invention. This may occur, for example, when in FIFO buffer bypass mode, or when the FIFO memory buffer 111 is empty. The process begins at step 301 in which there is a determination as to whether there is new data ready at the output holding register 109. As described above with regard to FIG. 2, the steps associated with FIG. 3 may be performed by a controller that includes an application specific integrated circuit (ASIC), or firmware executed by a processor.

Upon there being new data ready at the output holding register 109, the process continues to step 303. In step 303, there is a determination as to whether output port 115 is busy (e.g., reading and transmitting the digital data in output port 115). When the output port 115 is not busy, data is copied from the output holding register 109 to the output staging register 113, in step 305.

In various embodiments of the invention, the FIFO memory buffer 111 may be narrower than the width of a data entry to be transferred, such that a plurality of writes to the FIFO memory buffer 111 is performed when pushing a data entry to the FIFO memory buffer 111, and a plurality of reads from FIFO memory buffer 111 is performed when popping a data entry to the output port. For example, the sensor 103 may be an accelerometer that measures acceleration in the X, Y and Z directions. The width of the FIFO memory buffer 111 may be sufficient to store data associated with only one of the X, Y and X directions. Thus, each time data is read from the sensor into the FIFO memory buffer 111 via the single memory port, or transferred from the FIFO memory buffer 111 to the output port 115 via the single memory port, three reads or writes may be performed to transfer the entire X, Y and Z data set. If only a single word read operation is performed, the other two axes worth of data would be lost. Therefore, all three axes data may be read or written into the FIFO memory buffer 111 in a burst read or write operation that may use, without limitation, three clock cycles. In various embodiments, there may be multiple output holding registers or output staging registers to accommodate the data set.

Embodiments may be implemented as a computer program product for use with a computer system. Such implementation may include a series of computer instructions fixed either on a tangible medium, such as a computer readable medium (e.g., a diskette, flash memory, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions may embody all or part of the functionality previously described herein with respect to the method and system. Those skilled in the art should appreciate that such computer instructions may be written in a number of programming languages for use with many computer architectures or operating systems. For example, embodiments may be implemented in a procedural programming language (e.g., "C") or an object oriented programming language (e.g., "C++"). Alternative embodiments of the invention may be implemented as pre-programmed hardware elements, other related components, or as a combination of hardware and software components.

Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Thus, some embodiments of the invention may be implemented as hardware, software (e.g., a computer program product), or a combination of both software and hardware.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A digital output sensor comprising:
   a sensor module for providing digital data representative of a sensed parameter;
   an output port for transmitting the digital data;
   a First-In-First-Out (FIFO) memory buffer having a single port memory, wherein the digital data from the sensor module is pushed into the FIFO memory buffer via a single memory port, and wherein the digital data is popped out of the FIFO memory buffer via the single memory port for receipt by the output port;
   an output holding register operatively coupled between the sensor module and the single port memory, the output holding register for temporarily storing the digital data from the sensor module prior to being pushed into the FIFO memory buffer via the single memory port;
   an output staging register operatively coupled between the single port memory and the output port, the output staging register for temporarily storing the digital data popped from the FIFO memory buffer via the single memory port; and
   a controller which controls the FIFO memory buffer, the controller configured to:
      determine when new digital data is ready at the output holding register;
      when new digital data is ready at the output holding, push new digital data from the output holding register into the FIFO memory buffer via the single memory port;
      when there is no new digital data ready at the output holding register, determine whether to pop the digital data from the FIFO memory buffer to the output staging register via the single memory port, and if so, pop the digital data from the FIFO memory buffer to the output staging register via the single memory port; and
      when the output staging register is empty and the FIFO memory is empty, determine whether to bypass the FIFO memory buffer and transfer new digital data directly from the output holding register to the output staging register.

2. The digital output sensor according to claim 1, wherein the controller controls the FIFO memory buffer to pop the digital data to the output staging register substantially upon the output port becoming not busy.

3. The digital output sensor according to claim 1, further comprising:
wherein when the digital output sensor is in a second mode the FIFO memory buffer is bypassed such that digital data is transferred from the output holding register to the output staging register without passing through the FIFO memory buffer.

4. The digital output sensor according to claim 1, wherein the output port has a data transfer rate that is faster than the sensor module digital data output rate.

5. The digital output sensor according to claim 1, wherein the digital output sensor includes a MEMS accelerometer.

6. The digital output sensor according to claim 1, wherein the FIFO memory buffer is narrower than the width of a data entry to be transferred, such that a plurality of writes to the FIFO memory buffer is performed when pushing a data entry to the FIFO memory buffer, and a plurality of reads from FIFO memory buffer is performed when popping a data entry to the output port.

7. A chip comprising the digital output sensor of claim 1.

8. A method of providing sensor data within a digital output sensor, the method comprising:
providing digital data representative of a sensed parameter to an output holding register;
sending the digital data to a First-In-First-Out (FIFO) memory buffer having a single port memory, wherein the digital data is received from the output holding register and pushed into the FIFO memory buffer via the single memory port;
popping the digital data out of the FIFO memory buffer into an output staging register via the single memory port; and
sending the digital data from the output staging register to an output port,
wherein the method includes controlling the FIFO memory buffer, the controlling including:
determining when new digital data is ready at the output holding register;
when new digital data is ready at the output holding register, push new digital data from the output holding register into the FIFO memory buffer via the single memory port;
when there is no new digital data ready at the output holding register, determine whether to pop the digital data from the FIFO memory buffer to the output staging register via the single memory port, and if so, pop the digital data from the FIFO memory buffer to the output staging register via the single memory port; and
when the output staging register is empty and the FIFO memory is empty, determine whether to bypass the FIFO memory buffer and transfer new digital data directly from the output holding register to the output staging register.

9. The method according to claim 8, wherein popping digital data from the FIFO memory buffer into the output staging register occurs substantially upon the output port becoming not busy.

10. The method according to claim 8, further comprising sensing inertial data by a MEMS accelerometer, and wherein the digital data is representative of sensed inertia.

11. The method according to claim 8, wherein when the digital output sensor is in a second mode the method further includes bypassing the FIFO memory buffer such that digital data is transferred from the output holding register to the output staging register without passing through the FIFO memory buffer.

12. The method according to claim 8, further comprising transmitting the digital data via the output port, wherein the output port has a data transfer rate that is faster than the sensor module digital data output rate.

13. The method according to claim 8, wherein the FIFO memory buffer is narrower than the width of a data entry to be transferred, such that a plurality of writes to the FIFO memory buffer is performed when pushing a data entry to the FIFO memory buffer, and a plurality of reads from FIFO memory buffer is performed when popping a data entry to the output port.

14. A computer program product for use on a computer system for controlling a digital output sensor having a sensor module for providing digital data representative of a sensed parameter, the digital output sensor further including an output port for transmitting the digital data, a First-In-First-Out (FIFO) memory buffer having a single port memory, an output holding register operatively coupled between the sensor module and the single port memory, the output holding register for temporarily storing the digital data from the sensor module prior to being pushed into the FIFO memory buffer via a single memory port, and an output staging register operatively coupled between the single port memory and the output port, the output staging register for temporarily storing popped digital data from the FIFO memory buffer via the single memory port, the computer program product comprising a computer usable medium having computer readable program code thereon, the computer readable program code including program code for:
program code for providing the digital data representative of the sensed parameter to the output holding register;
program code for sending the digital data to the First-In-First-Out (FIFO) memory buffer having the single port memory, wherein the digital data is received from the output holding register and pushed into the FIFO memory buffer via the single memory port;
program code for popping the digital data out of the FIFO memory buffer into the output staging register via the single memory port;
program code for sending the digital data from the output staging register to an output port;
program code for determining when new digital data is ready at the output holding register;
program code for, when new digital data is ready at the output holding register, pushing new digital data from the output holding register into the FIFO memory buffer via the single memory port; and
program code for, when there is no new digital data ready at the output holding register, determining whether to pop digital data from the FIFO memory buffer to the output staging register via the single memory port, and if so, pop the digital data from the FIFO memory buffer to the output staging register via the single memory port; and
program code for, when the output staging register is empty and the FIFO memory buffer is empty, determining whether to bypass the FIFO memory buffer and transfer new digital data directly from the output holding register to the output staging register.

* * * * *